May 4, 1954  F. W. SCHWARZ  2,677,223
LAWN SWEEPER AND MATERIAL DISINTEGRATOR
Filed Jan. 22, 1952  3 Sheets-Sheet 1
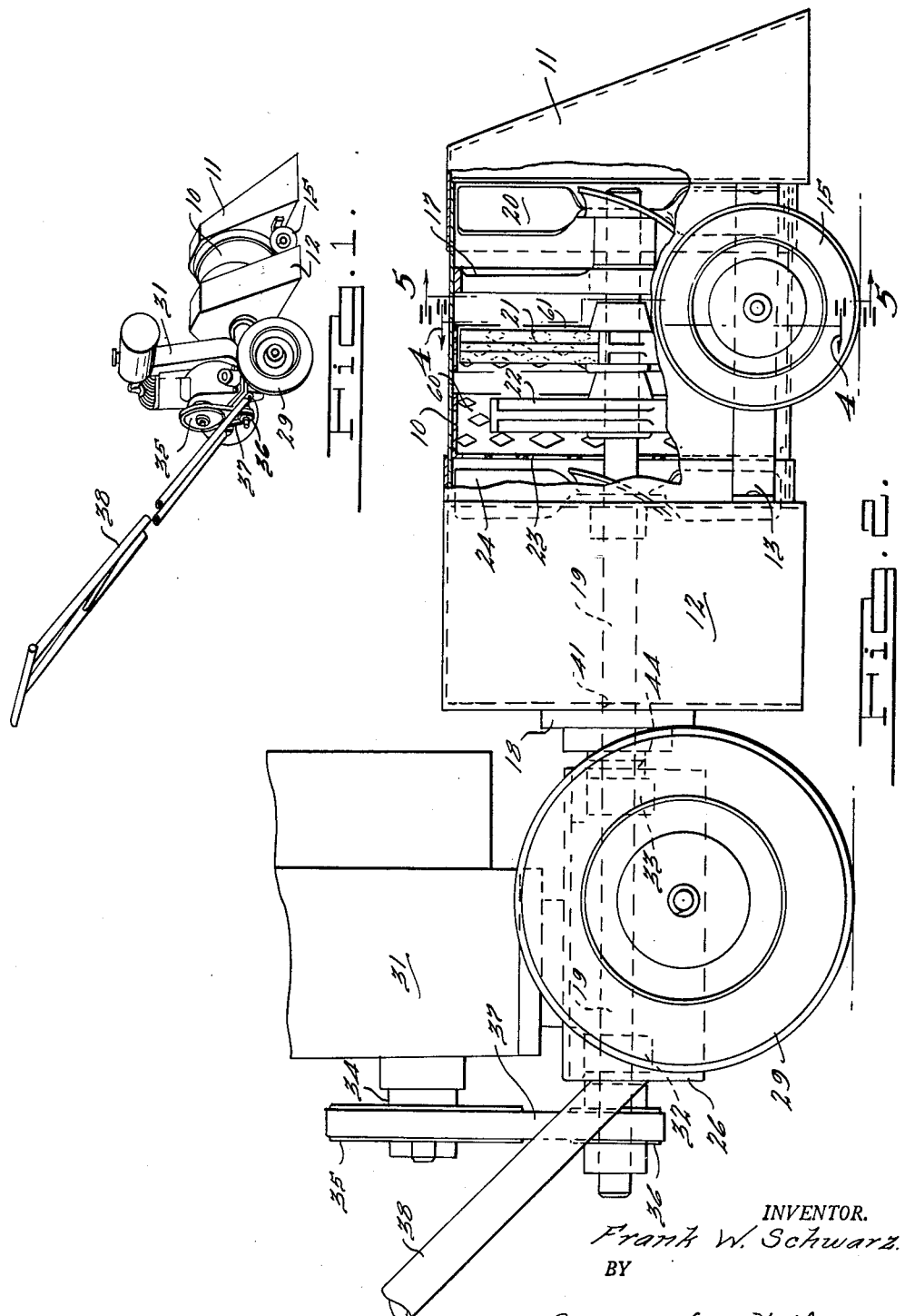
INVENTOR.
Frank W. Schwarz.
BY
Maxwell J. Wallace
ATTORNEY.

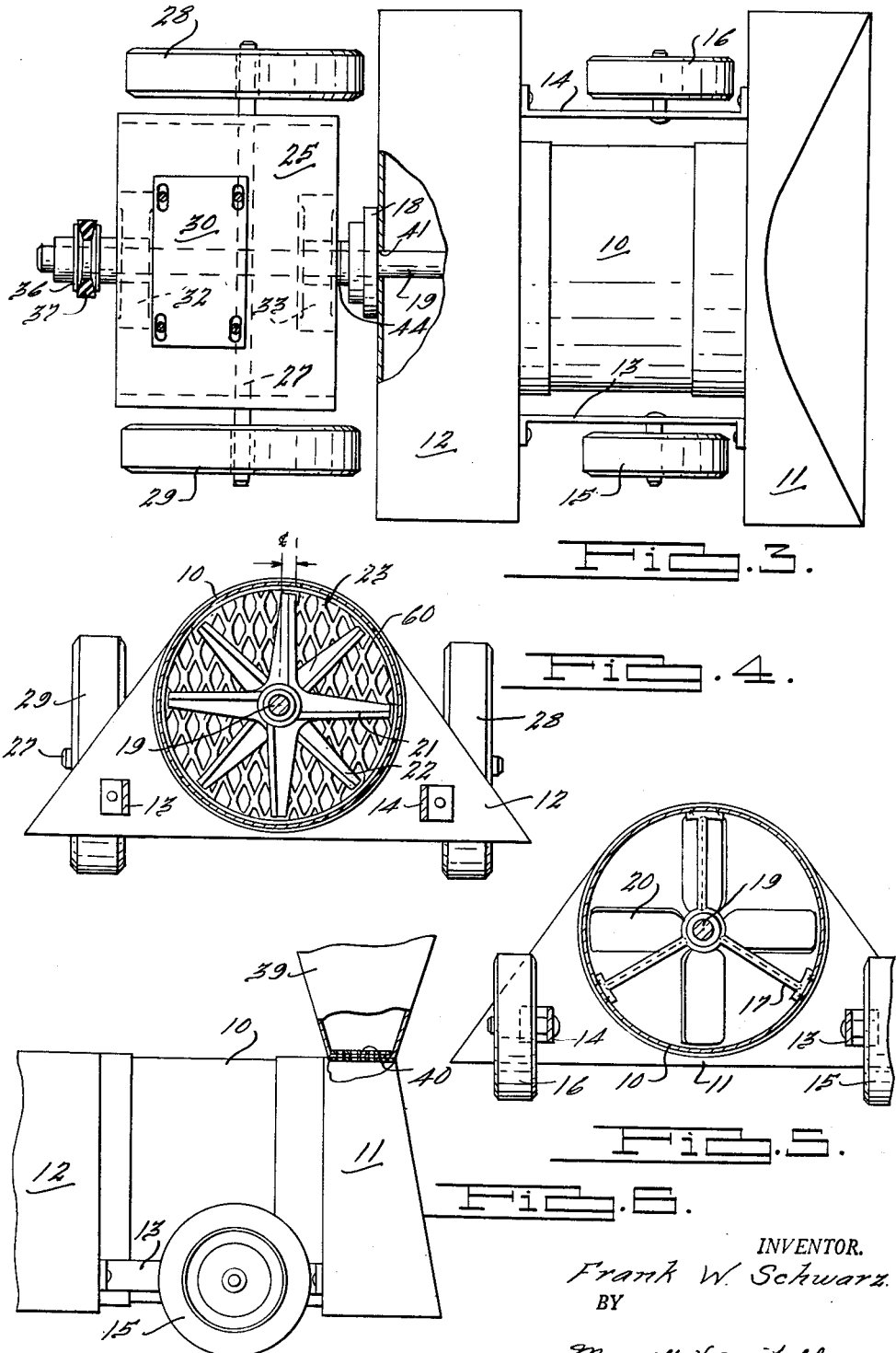

May 4, 1954 F. W. SCHWARZ 2,677,223
LAWN SWEEPER AND MATERIAL DISINTEGRATOR
Filed Jan. 22, 1952 3 Sheets-Sheet 3
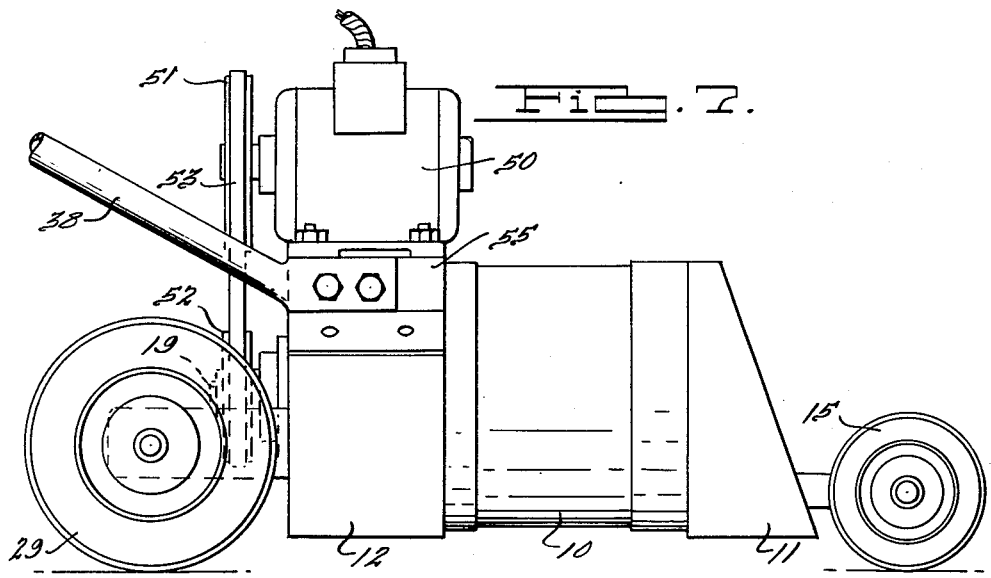
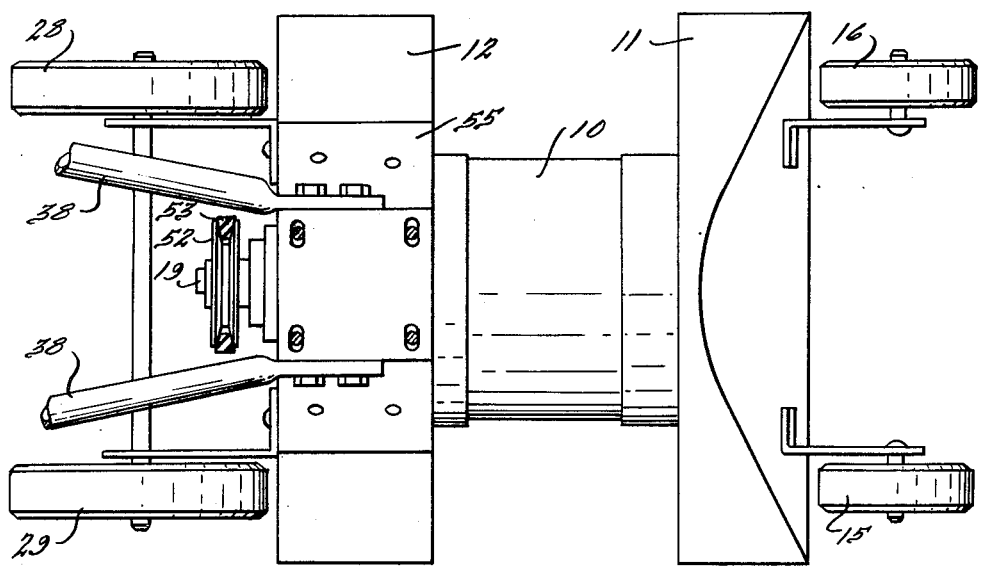
INVENTOR.
Frank W. Schwarz
BY
Maxwell V. Wallace
ATTORNEY.

Patented May 4, 1954

2,677,223

UNITED STATES PATENT OFFICE 2,677,223

LAWN SWEEPER AND MATERIAL DISINTEGRATOR

Frank W. Schwarz, Berkley, Mich.

Application January 22, 1952, Serial No. 267,615

5 Claims. (Cl. 55—118)

This invention relates to a new and improved device for gathering leaves, mown grass, twigs, sticks, etc., that collect on lawns or surface areas, grinding and disintegrating the gathered material, and then distributing the finely reduced product back upon the cleared surface as a fertilizing mulch.

In addition to the leaf gathering feature, the device may simply be transformed into a seeder and spreader for grass or other crops, by attaching thereto a hopper member which allows the passage of seed through the device and distributes it upon the area to be sown.

The above and other features will be seen from the following more detailed description, and from the drawings, wherein:

Fig. 1 is a perspective view of the device in its preferred form.

Fig. 2 is an enlarged side elevation with parts thereof broken away to show the interior of the device.

Fig. 3 is an enlarged top plan view with the motor removed.

Fig. 4 is a section taken on a reduced scale substantially on line 4—4 of Fig. 2.

Fig. 5 is a section taken on a reduced scale substantially on line 5—5 of Fig. 2.

Fig. 6 is a modification of the device showing a hopper mounted on top of the intake nozzle to hold seed.

Fig. 7 is a side elevation of an alternate form of the invention; and

Fig. 8 is a top plan view of the device shown in Fig. 7.

Referring now to the drawings, the device is what might be termed a built-up structure of light gauge sheet steel, or the like, i. e., wherein a front and rear nozzle are secured to a disintegrator or crushing chamber and this entire unit may be detachably secured, by means of a power shaft, to a separate power unit.

A crushing chamber 10, the same being formed as a tube, open at both ends, is provided, to one end of which is secured, by means of Parker screws, or the like, for easy removal, a front intake nozzle 11. As shown best in Figs. 2 and 3, intake nozzle 11 is formed to provide a wide somewhat narrow housing, open at the bottom thereof to receive the matter to be picked up, and having a side or back opening therein to correspond to one open end of chamber 10, so that when the front nozzle is connected to the crushing chamber, the matter passing up through nozzle 11 will pass into chamber 10. Spot-welded to the other end of chamber 10 is an exhaust nozzle 12, the same being formed as a housing, open at the bottom to exhaust the mulch after the same has passed through crushing chamber 10. Nozzle 12 also has an opening therein corresponding to the diameter of chamber 10, so that when the two are welded together, matter being processed can pass thereinto. The exhaust nozzle has greater area than the intake nozzle 11, for a purpose later to be described, and also has provided in the back thereof a bearing opening 41. So that the entire assembled unit may be moved from place to place, a pair of wheel brackets 13, 14, are provided, the same being suitably secured to the lower portions of nozzles 11 and 12, and being adapted to receive a pair of supporting wheels 15, 16, Fig. 3.

Suitably mounted, as by bolts or the like, within crusher chamber 10, is a spider bearing bracket 17, the same, as shown best in Fig. 5, having three supporting arms. Another bearing member 18 is secured to the exterior of exhaust nozzle 12, said bearing members 17, 18, being adapted to support and journal a power shaft 19. On the forward end of shaft 19, adjacent intake nozzle 11, a fan 20 is suitably mounted and secured, as with a set screw, and immediately back of spider bearing 17 are mounted on shaft 19 a pair of crusher blades 21, 22, the same being secured by means of set screws, and having flat blade surfaces, said blades being made of cast iron with chilled cutting edges to resist abrasive action of matter being reduced within crushing chamber 10, as shown in Fig. 2. It will be noted that the face of the crusher blades is offset from the center line of the fan shaft giving a shearing action between the blades and the material being processed. These blades are mounted so that no two of the blades are in longitudinal alignment. Immediately to the rear of crusher blades 22, a baffle screen member 23 is provided, said screen having formed thereon a peripheral flange 60, of the same material, said flange being slightly wider than crusher blades 22. Said screen 23 has a central opening therethrough to allow power shaft 19 to pass and rotate freely and the screen and flange are spot welded to the inner periphery of chamber 10. Immediately back of baffle screen 23, a booster fan 24 is mounted and secured on power shaft 19. Another strip of expanded metal 61, Fig. 2, is spot welded to the inner periphery of chamber 10, said strip being slightly wider than blades 21.

A power unit is provided, the same being separated from the crushing unit, and consisting of a base 25 having the sides thereof turned down to form a pair of opposed skirts or brackets 26 adapted to receive axle 27, said axle 27 rotatably supporting a pair of wheels 28, 29. Base 25 has mounted thereon a plate 30 to which a motor 31 is secured to hold same rigidly upon said base. Secured to the bottom of said base 25 are two pillow blocks 32, 33, having standard set-collars thereon, Fig. 2. Motor 31 has a take-off shaft 34, to which is secured a belt pulley 35. Another pulley 36 is provided, the same being adapted to be secured to power shaft 19 by a set screw or the like, and driving belt 37 is provided to provide a belt run between pulleys 35 and 36. A handle 38 is suitably secured to the power unit so that the user may push the device from place to place when operating same.

In Fig. 6 of the drawings there is disclosed an alternate form of the invention wherein a hopper member 39 is provided, the same being the width of intake nozzle 11, and suitably secured to the top thereof. To allow seed to pass from the hopper into intake nozzle 11 there are provided a plurality of openings, preferably staggered, in the bottom of the hopper, and the top of the nozzle 11, and a slide 40 being provided having corresponding openings therein so that the slide may be moved back and forth to open or close said openings and allow seed to pass therethrough or to close the hopper openings when the user is through seeding.

In Figs. 7 and 8 of the drawings there is disclosed another alternate form of the invention wherein a separate power unit is dispensed with and the crusher unit is self-contained, the same having brackets secured to nozzles 11 and 12 to rotatably support wheels 15, 16, 28 and 29. A bracket 55 is mounted on top of exhaust nozzle 12 to support an electric motor 50, or other source of power, if desired. A pulley 51 is secured to the armature shaft of motor 50, and a pulley 52 is secured to one end of power shaft 19. A belt run 53 is provided to rotate shaft 19 when motor 50 is in operation. Handles 38 are secured to the sides of bracket 55 to provide means for pushing the unit from place to place.

The manner in which the device operates is as follows:

As described above, the device consists of two sections, a crushing section and a power unit, and the crusher section may be quickly disengaged from the power unit by simply removing pulley 36 from shaft 19, loosening set screws in set collars in pillow blocks 32, 33, and the crusher section may be then moved from the power unit for cleaning, shipment or storage. To engage the two units the protruding portion of power shaft 19 is simply threaded through pillow blocks 33, 32, set collars tightened, pulley 36 moved in place on shaft 19, and set screw tightened, then belt 37 slipped over pulleys 35, 36. A gasoline type motor is shown in Fig. 1, but any type of power may be used, just so long as the source of power provides sufficient revolutions per minute to create the necessary crushing action and vacuum to thoroughly disintegrate the material being processed. The only mechanical connection between the crusher unit and the power unit is the power shaft 19 supported by bearing 18 and the first pillow block 33. This type of coupling allows either the power unit or the crusher unit to rotate freely and follow the unevenness of the ground and allows for the intake and exhaust nozzles to remain parallel at all times with the ground, and provides uniform pick-up and distribution and ease of operation to a great extent. For example, one wheel of the power unit might be in a depression in the ground while the crusher unit remained on fairly flat ground, or vice versa. With this type of connection 44, the intake nozzle remains parallel with the surface over which it is passing. To assure uniform pick-up and distribution of a machine of this character, it becomes very important to keep the intake and exhaust nozzles always parallel with the ground.

As pulley 35 is rotated, power is imparted to pulley 36 through belt run 37, and inasmuch as pulley 36 is secured to power shaft 19, said shaft is rotated. Fan 20, cutter blades 21 and 22, and fan 24 are all secured to shaft 19, and rotate in unison therewith on account of the same having an horizontal common rotatable power shaft 19. Intake nozzle 11, which is open throughout the extent of its bottom, and which open bottom is positioned to travel close to the ground surface as the machine is propelled over the ground in its use, once power shaft 19 is rotated at ample speed, a draft of air is drawn in through the bottom flared portion, and into chamber 10. This draft of air, formed by the rotating fans, produces a partial vacuum causing grass, leaves, twigs, etc., to pass up through nozzle 11 into crushing chamber 10 where fan 20 blows them against the rotating crusher blades 21, 22. Inasmuch as no two of these blades are in longitudinal alignment, the picked-up matter is shredded into small particles by said blades. At times, while the machine is operating, centrifugal packing will occur, which is caused by material being processed bunching between the ends of blades 21, 22 and the smooth inner periphery of chamber 10 and stopping the machine. This is overcome by means of peripheral flange 60 of baffle screen 23, which envelops blades 22, and strip 61, which envelops blades 21, both flange 60 and strip 61 being slightly wider than blades 22 and 21 and being formed of the same material as screen 23, said material producing intermittent contours which in turn break up the material being processed to such an extent that it is enabled to pass the blades and enter screen 23. Inasmuch as booster fan 24 is also rotating at the same speed as fan 20, the chopped matter is further drawn against screen 23 which acts as a baffle to stop the passage of chopped matter which has not been sufficiently disintegrated. The suction caused by booster fan 24 causes the chopped matter to be thrown against baffle screen 23, which screen in turn rejects the larger pieces that have passed the crusher blades and the air stream in the chamber returns them within the area of the crusher blades for further processing. All the matter that has been sufficiently processed passes on through the baffle screen to be deposited upon the surface of the area being covered. So that there is not too much of a build-up of pressure from rotating booster fan 24 in nozzle 12, said nozzle is the same width as intake nozzle 11, but as shown in Fig. 2, the depth of exhaust nozzle 12 is considerably greater than that of nozzle 11. This also allows for a greater area spread of the mulch which is extruded from the machine under reduced pressure. Inasmuch as intake nozzle 11 and exhaust nozzle 12 are in longitudinal alignment and the same height from the ground, the space cleaned by nozzle 11 is quickly fertilized by the mulch from exhaust nozzle 12.

To compensate for the irregular contour of the land over which the device is propelled, self-aligning bearings are provided so that there is no distortion of any kind. This allows for the lateral movement of the chopper unit from side to side while in forward movement over the ground being processed. The device is not self-propelled, but the four point suspension, using rubber-tired wheels, makes the same very easy to push while in motion, and the long handle 38 makes for simple steering and turning.

When using the device for seeding purposes, it is simply necessary to place the seed required in hopper 39 and open stop 40 so that the holes in the bottom of the hopper are in vertical alignment with the holes in the top of intake nozzle 11. When the power is turned on and the fans are moving, the seed is drawn down into nozzle 11 and drawn through crusher chamber 19 and into exhaust nozzle 12, which in turn distributes the seed over an area at least as great as the size of the bottom of nozzle 12.

When using the self-contained crusher unit shown in Figs. 7 and 8, of the drawings, the user has simply to plug in the motor 50 to an electrical outlet with sufficient cord to allow the same to be pushed over the area desired to be cleaned. Once motor armature shaft on motor 50 is rotating, belt 53 in turn rotates pulley 52 secured to power shaft 19 rotating the same as explained in operating the crusher chamber in the two-unit device, the crusher unit of Figs. 7 and 8 being identical in construction. Any type of power may be substituted for the electric motor shown, but many people prefer an electric motor due to the easy starting of same compared with a gasoline engine of the type used on power mowers. Hopper 39 may also be secured to intake nozzle 11 of this model, if desired, and the same converted into a seeder as above explained.

While I have described and illustrated a satisfactory device that has proven highly successful in practical operation, it will be understood that the invention is not limited to specific constructional details shown and described, but that many changes, variations, and modifications may be resorted to without departing from the principles of my invention.

I claim:

1. A combined lawn sweeper and material disintegrator comprising a mobile horizontally disposed cylinder, forming a body member and having a nozzle member at one end thereof provided with a downwardly directed inlet opening and a discharge nozzle member at the other end of the cylindrical body member provided with a downwardly directed outlet opening, a screen extending diametrically across the cylindrical body member intermediate the inlet and outlet ends thereof, a shaft extending axially into the cylinder and projecting beyond the outlet end thereof, power driven means on said shaft for actuating the same, a suction creating fan mounted on said shaft adjacent the inlet end of the cylinder, and chopper blades mounted on said shaft between the suction fan and the screen, whereby when the fan is in operation loose material is picked up by the inlet nozzle member, passed through the fan and chopper blades to disintegrate such material, and disintegrated material of predetermined maximum size is discharged through the outlet nozzle member onto the ground after having passed through the screen.

2. A combined lawn sweeper and material disintegrator as set forth in claim 1, wherein a booster fan is mounted on said power shaft at the opposite end of the cylinder from the first mentioned suction creating fan.

3. A combined lawn sweeper and material disintegrator as set forth in claim 1, wherein a power unit, including power means for actuating the power shaft, is carried upon a mobile chassis, said mobile chassis having longitudinally spaced bearings mounted on said power shaft, thereby permitting tilting of the power unit relative to said cylindrical body member.

4. A combined lawn sweeper and material disintegrator as set forth in claim 1, wherein the inlet and discharge nozzle members are flared outwardly from the upper to the lower portions thereof and each is provided with an enlarged mouth portion adjacent the ground level.

5. A combined lawn sweeper and material disintegrator as set forth in claim 1, wherein a peripheral strip of screen material is provided within the cylindrical body member surrounding the chopper blades.

References Cited in the file of this patent

UNITED STATES PATENTS

| Number | Name | Date |
|---|---|---|
| 2,105,803 | Barnes | Jan. 18, 1938 |
| 2,244,987 | Faulkner | June 10, 1941 |
| 2,476,465 | Tarrant | July 19, 1949 |
| 2,538,643 | Gregory | Jan. 16, 1951 |
| 2,590,734 | Strong | Mar. 25, 1952 |